July 18, 1933.　　　J. N. JACOBSEN　　　1,918,752
LIQUID TREATING APPARATUS
Filed Oct. 14, 1930　　　5 Sheets-Sheet 1
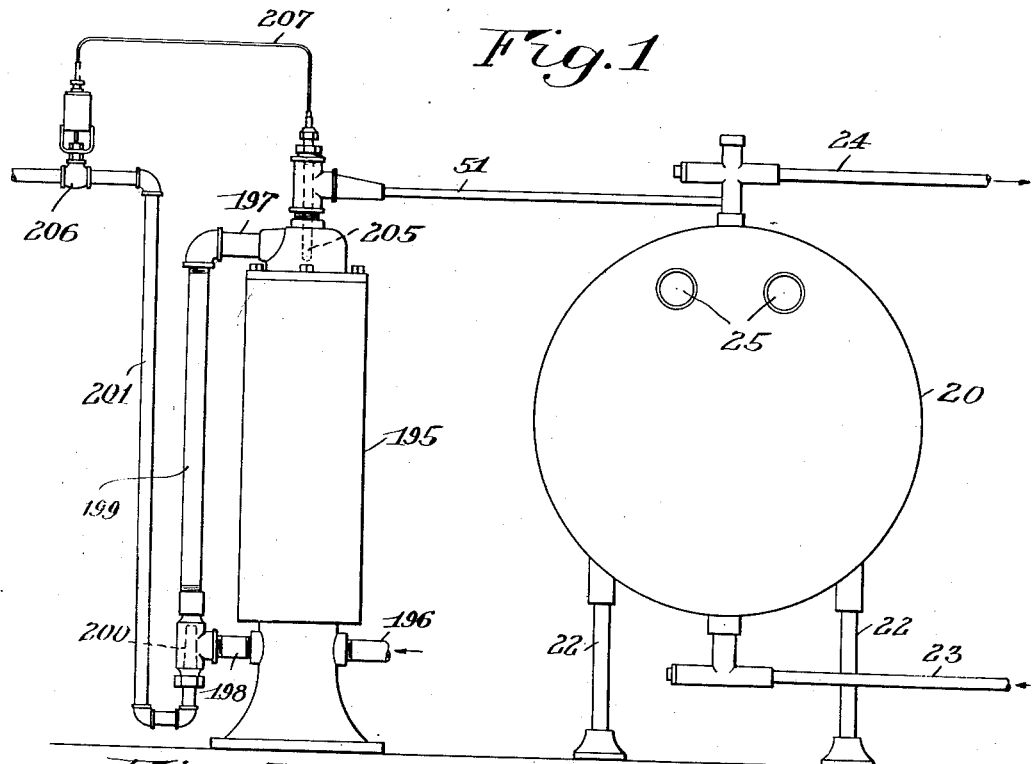
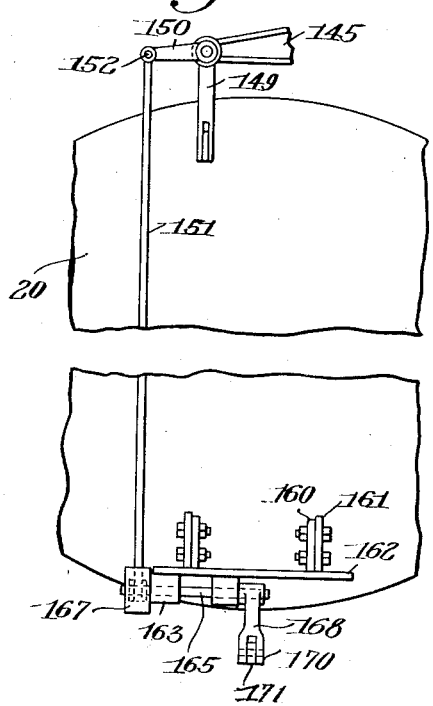
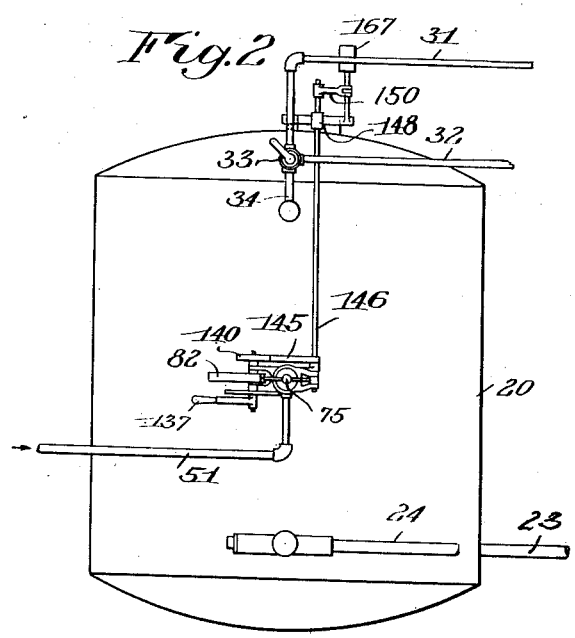
INVENTOR
Jens N. Jacobsen
BY Edward H. Dumpston
his ATTORNEY July 18, 1933.     J. N. JACOBSEN     1,918,752
LIQUID TREATING APPARATUS
Filed Oct. 14, 1930     5 Sheets-Sheet 2
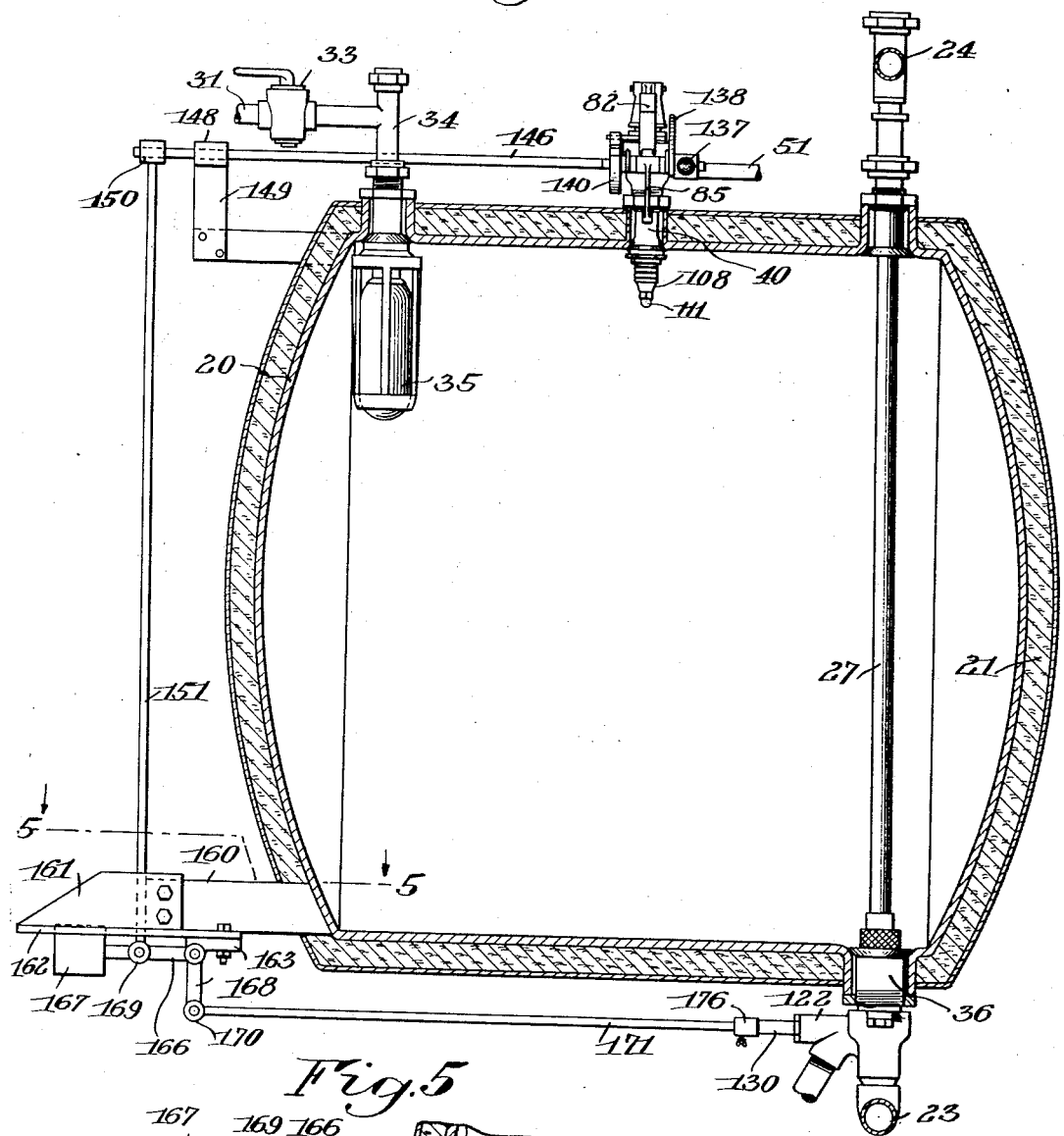
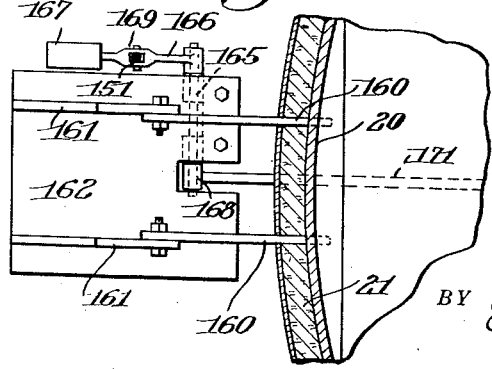
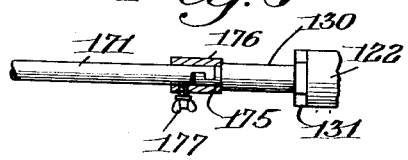
INVENTOR
Jens N. Jacobsen
BY Edward H. Cumpston
his ATTORNEY

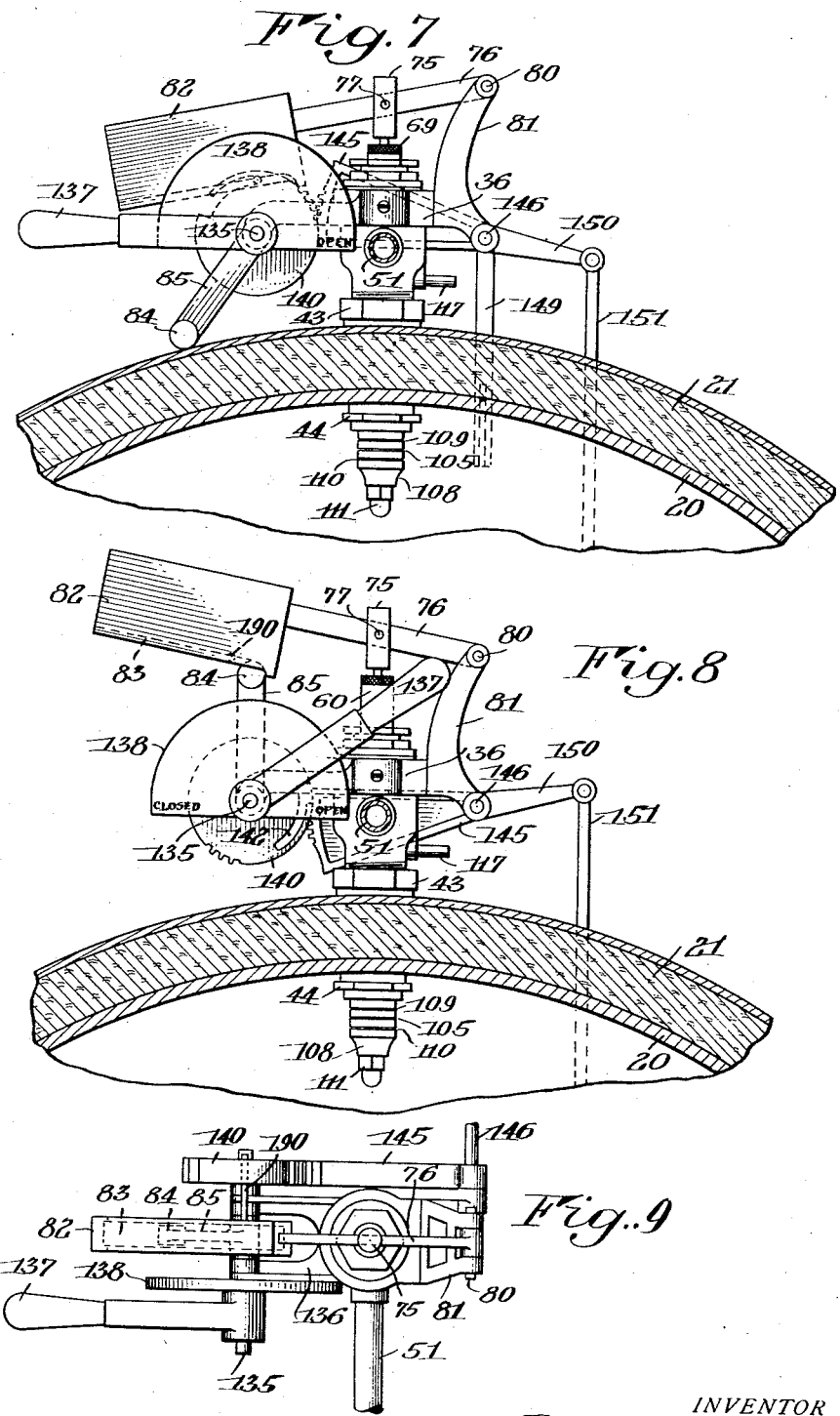

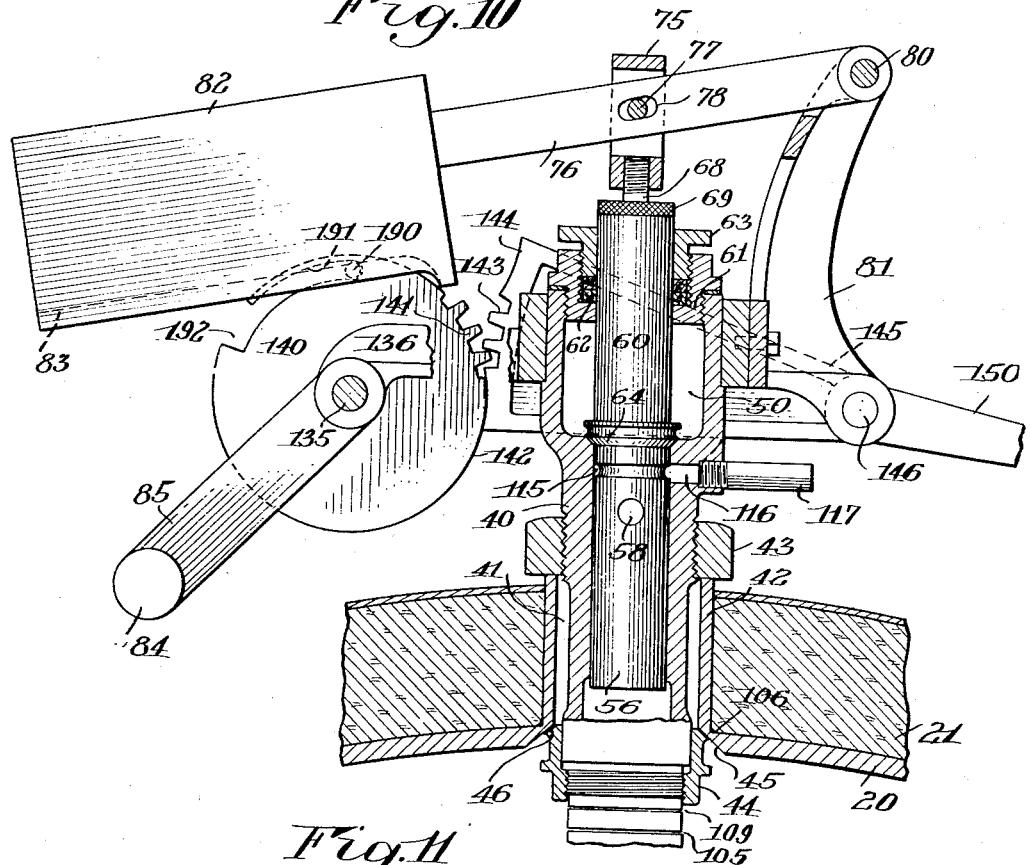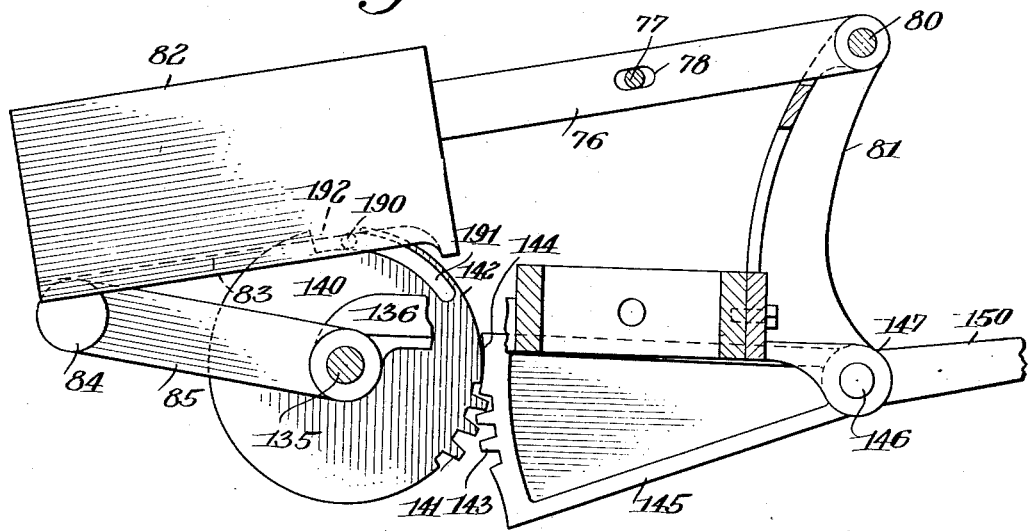

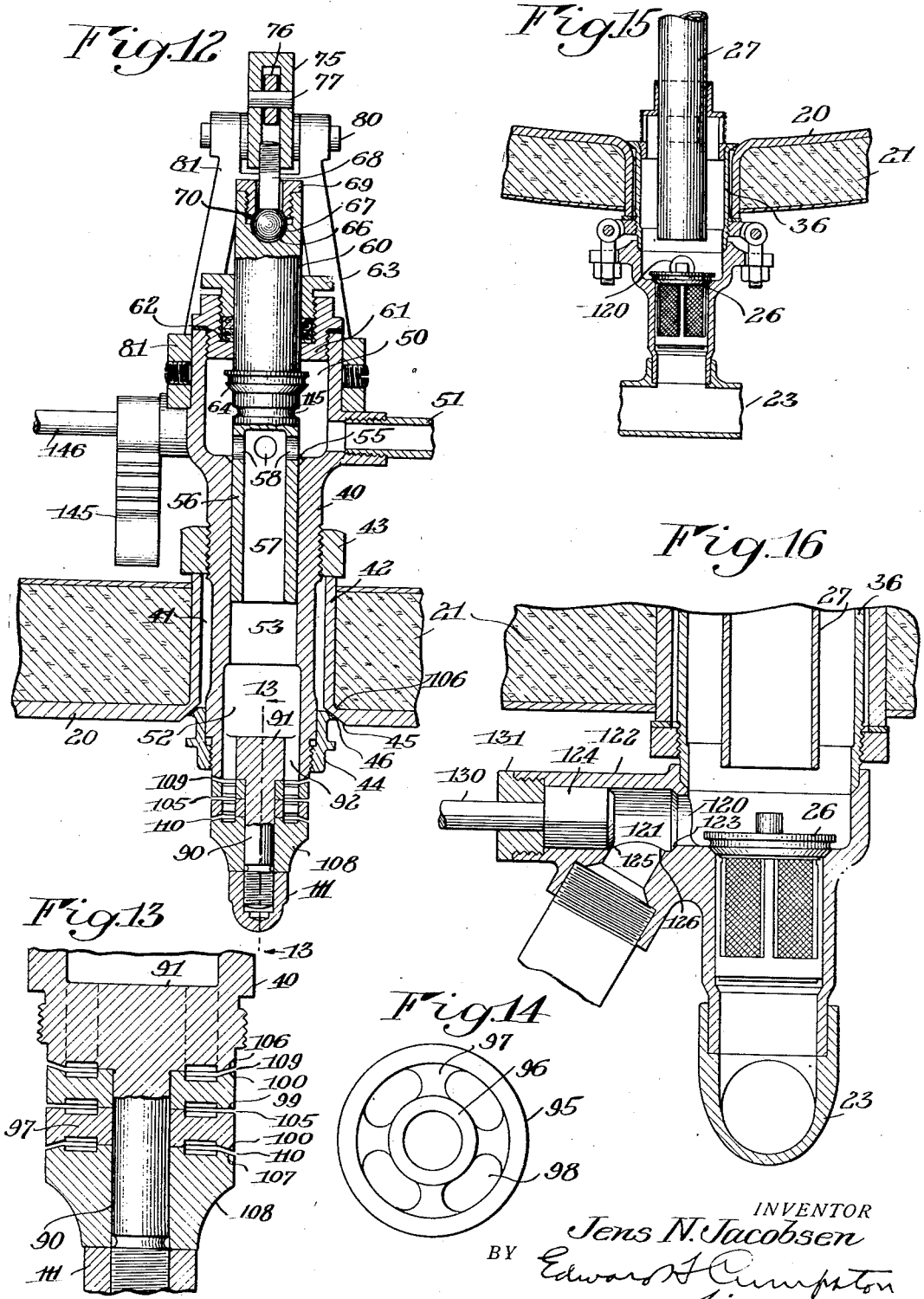

Patented July 18, 1933

1,918,752

UNITED STATES PATENT OFFICE

JENS N. JACOBSEN, OF ROCHESTER, NEW YORK, ASSIGNOR TO THE PFAUDLER CO., OF ROCHESTER, NEW YORK, A CORPORATION OF NEW YORK

LIQUID TREATING APPARATUS

Application filed October 14, 1930. Serial No. 488,689.

This invention relates to the cleaning of tanks, such for example as milk pasteurizer holding tanks. In the operation of milk pasteurizer holding apparatus, it is found that when the holding tank is emptied of one batch of milk, a film of milk remains on the walls of the tank, and that certain bacteria, especially those known as thermophilic bacteria, thrive and multiply in this film of milk. Then when the next batch of milk is introduced into the tank, it becomes contaminated by the bacteria in the residual film of milk. It is an object of the present invention to provide simple and satisfactory apparatus for removing the residual film of milk after a batch of milk has been discharged from the holding tank and before the next batch is introduced therein, thus preventing or greatly reducing the contamination of the next batch of milk.

Another object of the invention is the provision of tank cleaning apparatus so arranged that a discharge passage for washing liquid must necessarily remain open until after the supply of washing liquid has been cut off, thus insuring removal of all the washing liquid from the tank and preventing dilution of milk or other liquid being treated.

Still another object of the invention is the provision of means for supplying hot washing liquid and improved means for heating the washing liquid.

A further object is the provision of simple and effective spray means for spraying the washing liquid, and of simple valve mechanism for controlling the flow of washing liquid.

To these and other ends the invention resides in certain improvements and combinations of parts, all as will be hereinafter more fully described, the novel features being pointed out in the claims at the end of the specification.

In the drawings:

Fig. 1 is a general view of a preferred embodiment of the invention showing a milk pasteurizer holding tank and a heater which furnishes hot water for washing the tank;

Fig. 2 is a plan view of the tank showing the location of the spray valve on the tank and means for operating the spray and discharge valves;

Fig. 3 is a fragmentary elevation of the rear of the tank showing part of the mechanism for operating the discharge valve;

Fig. 4 is a vertical sectional view taken substantially along the center line of the tank;

Fig. 5 is a horizontal section taken substantially on the line 5—5 of Fig. 4;

Fig. 6 is a portion of a rod for operating the washing liquid discharge valve showing the means for connecting the rod to the valve stem;

Fig. 7 is an elevation view of a spray valve and its operating mechanism showing the position of said mechanism when the valve is closed;

Fig. 8 is a view similar to Fig. 7 showing the position of the operating mechanism when the spray valve is open;

Fig. 9 is plan view of the spray valve and the operating mechanism therefor;

Fig. 10 is a vertical section through the spray valve showing the operating mechanism in the position it occupies when the spray valve and the discharge valve are both closed;

Fig. 11 is a view of the valve operating mechanism showing its position when the discharge valve is wide open and the spray valve is just about to open;

Fig. 12 is a vertical sectional view of the spray valve showing the arrangement of the parts and the manner of securing the valve to the tank;

Fig. 13 is a vertical sectional view of the lower end of the spray valve substantially on the line 13—13 of Fig. 12 showing the details of the spray nozzle;

Fig. 14 is a plan view of one of the spray disks which form the spray nozzle;

Fig. 15 is a vertical sectional view of a fragment of the bottom of the tank showing the milk inlet valve; and Fig. 16 is an enlarged sectional view taken at right angles to the plane of Fig. 15 showing the relation of the washing liquid discharge valve and the milk inlet valve.

Similar reference numerals throughout the several views indicate the same parts.

One of the methods of pasteurizing milk, known as the pasteurizing holding method, consists of heating the milk in a suitable heater to the proper pasteurizing temperature and then transferring the heated milk to one or more insulated holding tanks where it is held for a required period and is then discharged into a milk cooler or other suitable container. After the tank has been thus emptied a film of milk adheres to the walls of the tank, as mentioned above. In order to remove this film the present invention contemplates the use of spray means located in the upper part of the tank to spray a washing liquid over substantially the entire inner surface of the tank. The present invention also contemplates a discharge valve which remains open after the closing of the spray valve to insure the complete drainage of the wash water from the tank before the next batch of milk is introduced thereinto.

Referring to the drawings, Figs. 1 and 4 show a holding tank 20 covered with a suitable insulating material 21, mounted on legs 22 and provided with a milk inlet line 23, a milk discharge line 24, and glass covered observation openings 25. The inlet line 23, in which a suitable check valve 26, Fig. 16, is disposed, leads from a milk heater and is connected to the bottom of the tank. A discharge line 24, Figs. 1 and 4, is connected to the tank directly above the inlet line 23 and is provided with a downwardly extending tube 27 which projects into a well 36 at the inlet opening as illustrated in Figs. 15 and 16.

Various methods may be used for filling and emptying such a tank, but it is preferred to use a vacuum-pressure system comprising a vacuum conduit 31 and an air pressure conduit 32, Figs. 2 and 4, connected to a three-way valve 33 which is in turn connected to the tank by means of a conduit 34. The three-way valve 33 may be rotated to bring either the vacuum or the pressure conduit into communication with the tank or it may be rotated so as to cut off both conduits.

When the tank is to be filled, the valve 33 is rotated to bring the vacuum conduit 31, in which a suitable vacuum is maintained, into communication with the tank, thus causing a vacuum to be created therein. Such a vacuum causes the milk to be drawn into the tank through the conduit 23, the check valve 26 lifting to permit the passage of the milk. When the milk in the tank reaches the desired level, the valve 33 is turned to disconnect the tank from the vacuum conduit and stop further introduction of milk. The connection with the vacuum conduit may also be cut off automatically by means of the float valve 35, Fig. 4, which rises when the milk reaches a predetermined maximum level and thus closes the end of the conduit 34.

After the milk has remained in the tank for the desired holding period, the valve 33 is rotated to connect the pressure conduit 32 to the tank. The pressure in the conduit 32 first forces the float valve 35 downwardly, if it is closed, and then causes a pressure to be exerted over the surface of the milk, which pressure forces the milk upwardly through the tube 27 and through the discharge conduit 24, the check valve in the tube 27 lifting to permit the flow of milk. Since the bottom of the tube 27 extends down below the bottom of the tank and into a well 36, as shown in Figs. 15 and 16, it is thus possible to discharge from the tank all but a very small amount of the milk remaining in the bottom of the well 36.

When the tank has been emptied in the manner above described, a film of milk adheres to the walls of the tank and any thermophilic bacteria present therein may thrive and multiply in this film and thus contaminate the next batch of milk. In order to remove this film and the bacteria contained therein, the present invention provides means for applying a stream of washing liquid to substantially the entire inner surface of the tank subsequent to the removal of each batch of milk therefrom, this means preferably comprising spray means within the tank near the top thereof for spraying hot washing water.

The spray mechanism which supplies the washing water for removing this film comprises a valve body 40 extending through an opening 41 in the tank which is surrounded by an upwardly extending flange 42. The valve body is held in place by a nut 43 threaded thereon and engaging the top of the flange 42 exteriorly of the tank, and a nut 44 threaded on the valve body near the bottom end thereof, which engages a beveled seat 45 at the lower end of the flange 42, a gasket 46 being interposed between the nut 44 and the seat 45 to insure a liquid tight joint at this point.

The valve body 40 has a large upper cavity or chamber 50 supplied with washing liquid through a conduit 51, a lower cavity 52 of smaller diameter than the cavity 50, and an intermediate cavity in the form of a cylindrical bore 53 extending between and of smaller diameter than the upper and lower cavities. A conical valve seat 55 is provided on the shoulder formed between the upper cavity and the cylindrical bore. A valve member is movably mounted in the bore 53 and in the upper cavity 50 to control the flow of water to the spray nozzle. The valve member comprises a lower tubular portion 56 slidable in the bore 53 and having a longitudinal aperture 57 and radial apertures or ports 58 communicating with the aperture 57. The valve member further includes an upper portion or valve stem 60 integral with the tubular portion and extending upwardly through an opening in a head 61 which closes the upper end of the chamber 50 and which is provided with a recess for packing 62 surrounding the valve stem and held in place by a gland nut 63. A conical portion 64 in provided on the valve member for contacting with the valve seat 55 when the valve is in closed position, to prevent the washing liquid within the cavity 50 from passing downwardly into the bore 53. When the valve member is pulled upwardly by mechanism hereafter described, the conical portion 64 is unseated from the seat 55 and the ports 58 are raised to a position above the seat 55, as shown in Fig. 12, so that the liquid supplied by the conduit 51 may flow into the ports 58, downwardly through the aperture 57, and into the lower cavity 52.

The upper end of the valve stem 60 is provided with a spherical seat 66 in which the spherical head 67 of a bolt 68 rests. The head 67 is held in position by a plug 69 threaded into the valve stem and provided with a spherical seat 70 on the lower face thereof which contacts with the upper portion of the head 67. The plug 69 is adjusted to allow a slight play between the seat 70 and the upper portion of the head 67 to provide a swivel joint at this point. Such a joint permits the valve member to rotate slightly relative to the head 67 each time the valve member is moved if there is any tendency for it to do so, and thus the valve is likely to be turned to a slightly different position relative to the valve body each time the valve is seated, which will promote smooth and even wearing of the parts, reduce grooving of contacting surfaces, and lengthen the life of the valve.

The bolt 68 extends upwardly through the plug 69 and is threaded into a hollow block 75 through which a valve operating arm 76 extends, the block and arm being connected by a pin 77 on the block which passes through a slot 78 in the arm. Thus upward or downward movement of the arm is transmitted to the block to correspondingly open or close the valve.

One end of the arm 76 is pivoted at 80 to a bracket 81 secured to the valve body, while the other end thereof carries a weight 82 which tends to depress the end of the arm and thus to keep the valve closed. The weight 82 is provided with a slot 83 on its under face in which the rounded and enlarged end 84 of a valve operating arm 85 slides to lift the weight and thus open the valve in a manner hereinafter described.

The spray nozzle above mentioned may conveniently be formed by providing a stud 90 integral with and depending from a cross piece 91 secured in the lower cavity 52 of the valve body, suitable openings 92 being provided between the cross piece 91 and the walls of the cavity 52 to permit the water to flow downwardly from the cavity 52 to the spray nozzle. On this stud is mounted a plurality of disk-like members 95 which may be termed spray disks. These disks each comprise a boss 96 surrounding the stud 90, a web 97 surrounding and thinner than the boss and having apertures 98 therein to permit the flow of water from one side of the disk to the other, and an outer or peripheral portion having one face 99 thereof substantially in a plane while the other face 100 is substantially frusto-conical in shape. These disks may be duplicates of each other and are placed on the stud so that the lower disk is inverted relative to the upper disk, thus bringing the faces 99 of the two disks adjacent each other. The bosses 96 are of such size and shape that the faces 99 are slightly spaced from each other to provide a substantially horizontal spray opening 105. The conical face of the upper disk lies adjacent a corresponding substantially conical face 106 on the lower end of the valve body, while the conical face on the lower disk lies adjacent a substantially conical face 107 on a sleeve 108, the faces of the disks being spaced from the adjacent faces 106 and 107 by the bosses 96 so as to form the spray openings 109 and 110 as will be clearly seen in Fig. 13. The sleeve 108 is held in place by a nut 111 threaded on the lower end of the stud 90.

The washing liquid flowing downwardly through the valve body passes through the openings 92 and then through the apertures 98 in the webs of the disks so that the liquid may flow around the circumferential channels above and below the thin webs and thus reach all parts of the spray openings 105, 109, and 110. The liquid issuing from the space 109 will be directed slightly upwardly, the liquid flowing from the space 105 will issue substantially horizontally, and that issuing from the space 110 will be directed slightly downwardly as plainly apparent from Fig. 13. Thus the washing liquid will be sprayed outwardly in all directions around the spray nozzle and will fall upon substantially the entire surface of the tank.

In a valve of this type it is difficult to eliminate all of the leakage past the valve because of the wear on the valve member and valve seat and because of foreign matter becoming lodged between the valve member and valve seat, thus preventing the valve from properly closing. Such leakage should be prevented from entering the tank, so that it will not dilute the milk or other fluid being treated. The present invention provides means for preventing such entrance of leakage. This means comprises a circumferential groove 115 on the exterior of the tubular portion 56 of the valve member intermediate the apertures 58 and the conical portion 64, which groove registers with a drainage opening 116 in the valve body when the valve is in closed position as shown in Fig. 10. Any leakage past the valve seat is thus caught by the groove and is drained through the opening 116, from which it is conducted to any suitable point by the pipe 117.

The washing liquid which is sprayed into the tank flows downwardly over the walls of the tank and thus removes the film of milk which adheres thereto. The mixture of milk and washing liquid flows into the well 36 and is drained through a discharge opening which is located at the bottom of the well adjacent the milk inlet conduit 23 and which has an outflow capacity equal to or greater than the inflow capacity of the spray valve so as to prevent an accumulation of washing liquid in the tank. This discharge opening comprises an outlet port 120 leading to a longitudinal aperture 121 in a body 122. A conical valve seat 123 is provided at the junction of the port 120 with the aperture 121, and a valve plug 124 is slidable within the aperture 121 so that a conical end 125 thereon can be brought into contact with the conical seat 123 to close the valve, or may be withdrawn from the seat to open the valve and to permit the liquid to flow out through a port 126 in the bottom of the aperture 121. The plug 124 is provided with a stem 130 extending through a closure 131 threaded in the body portion 122 and removable therefrom to permit the withdrawal of the valve plug 124 for cleaning or grinding. The stem 130 is connected to a suitable valve opening mechanism in a manner hereinafter described. As will be seen clearly from Fig. 16, the bottom of the outlet port 120 is at the extreme bottom of the well 36, so that all the liquid will be completely drained from the tank when the outlet valve is opened.

In washing out a tank such as above described it is desirable to remove all of the washing liquid before the next batch of milk is placed in the tank. To accomplish this result it has been found advantageous to have the discharge valve close after the spray valve has been closed, sufficient time being allowed between the closing of the spray valve and closing of the discharge valve to permit all of the washing liquid to drain from the well 36.

While the spray and drain valves may be independently operated to accomplish these results, it is preferred to connect them so that they will operate concomitantly and in the proper timed relation, in order that the spray valve will be closed before the drain valve is closed, and the drain valve will be held open a sufficient time after the closing of the spray valve to permit complete draining of the liquid. The mechanism for operating the spray and drain valves in the proper timed relation comprises, in its preferred embodiment, a horizontal shaft 135 journaled in a U-shaped portion 136 of the bracket 81 and provided with an operating handle 137 for rotating the shaft. An indicating plate 138 mounted on the bracket 81 adjacent the handle bears suitable legends such as "open" and "closed". The valve operating arm 85 previously mentioned is mounted on this shaft 135, in such position that the enlargement 84 on the arm will engage the slot 83 and lift the weight 82 when the shaft is turned in one direction.

Also mounted on the shaft 135 is a Geneva driving gear 140 which has a tooth segment 141 and a locking segment 142 which engage corresponding tooth and locking segments 143 and 144, respectively, on a driven gear 145 fixed to a second shaft 146, which extends along the top of the tank and has the forward end thereof journaled at 147 in the bracket 81, while the rear end is journaled at 148 in the bracket 149 secured to the rear head of the tank. An arm 150 is secured to the rear end of the shaft 146, and is pivotally connected at 152 to the upper end of a vertical rod 151. The gears 140 and 145 are so shaped relative to each other that the shaft 146 will be rotated only during the first part of the rotation of the shaft 135 in a clockwise direction, and will be held stationary during the remainder of the rotation of the shaft 135. Similarly, when the shaft 135 moves back in a counter-clockwise direction to its initial position, the shaft 146 remains stationary until the latter part of the movement of the shaft 135, and then the shaft 146 is returned to its initial position only during the latter part of the movement of the other shaft.

The rear head of the tank adjacent the lower edge thereof has a plurality of strips 160 welded thereon to which are bolted the strips 161 welded to a horizontal plate 162 on the lower side of which is a bell crank supporting bracket 163. Mounted on this bracket is a bell crank comprising a shaft 165 journaled in the bracket 163, a horizontal arm 166 secured to one end of the shaft 165 and having a weight 167 on the outer end thereof, and a downwardly extending arm 168 secured to the other end of the shaft 165. The arm 166 is pivotally connected to the lower end of the vertical rod 151 at 169, while the arm 168 is pivotally connected at 170 to a rod 171, the other end of which is secured to the drain valve stem 130 in a manner hereinafter described.

Fig. 6 shows one means of connecting the rod 171 to the valve stem 130. The valve stem has a short section 175 of reduced diameter which is provided with a lug and notch constituting a hook-like portion at the end of the stem. This hook-like portion engages a corresponding hook-like portion on the end of the rod 171, as clearly shown in Fig. 6. In order to prevent disengagement of the hook-like portions from each other, a sleeve 176 is provided which surrounds the hook-like portions and normally abuts against a shoulder on the valve stem 130, being held in place by a thumb screw 177. When it is desired to disconnect the operating rod 171 from the valve in order to remove the valve for cleaning or repairs, the thumb screw 177 may be loosened, the sleeve 176 may be slid along the rod until it is free of the hook-like portions, and the hook-like portions may then be disengaged from each other by a transverse movement.

The valve operating mechanism operates as follows:

When the handle 137 is rotated clockwise, the shaft 135 and the gear 140 correspondingly rotate, and the toothed segment 141 thereof engages the tooth segment 143 of the gear 145, causing the latter gear as well as the shaft 146 to rotate in a counter-clockwise direction. This rotation of the shaft 146 moves the arm 150 upwardly and through the bell crank and the rods 151 and 171 move the valve plug 124 to the left as viewed in Fig. 4, thus opening the discharge valve. At this time the operating mechanism assumes some such position as that shown in Fig. 11, in which the discharge valve is open and the arm 85 is just coming into contact with the weight 82, the spray valve still being closed. Further rotation of the handle causes the arm 85 to move along the slot 83 in the weight 82 and thus to elevate the latter to the position shown in Fig. 8, to open the spray valve. Referring again to Fig. 11, it is evident that the second part of the movement of the shaft 135 will have no further effect upon the shaft 146 after the teeth on the gears 140 and 145 pass out of engagement with each other, the shaft 146 being maintained in position by engagement of the locking members 142 and 144.

When the valves are closed the operation is just the reverse of that described above. As the mechanism is rotated from the position shown in Fig. 8 to that shown in Fig. 11, the locking segments 142 and 144 of the Geneva gears slide relative to each other while the arm 85 gradually descends, allowing the weight 82 to move downwardly, thus closing the spray valve. When the position shown in Fig. 11 is reached, at which point the spray valve is closed and the discharge valve is still wide open, the tooth segments of the gears mesh with each other and further rotation of the shaft 135 causes the shaft 146 to be returned to its initial position to close the discharge valve. When the handle is operated reasonably slowly, as is contemplated in actual use, a sufficient interval of time elapses between the closing of the spray valve and the closing of the discharge valve to insure complete drainage from the tank of all the washing liquid.

In order to prevent lifting of the weight 82 by hand to open the spray valve without correspondingly opening the discharge valve, which would result in accumulation of washing liquid within the tank, locking means is provided which comprises a pin 190 secured to the weight 82 and extending into a circumferential slot 191 in the gear 140. Referring to Fig. 10, it is obvious from the position of the pin in the slot that the weight 82 cannot be raised. However, if the shaft 135 is rotated to the position shown in Fig. 11, the pin 190 registers with a radial slot 192 and the weight may then be raised, but, as stated above, when the mechanism is in this position the discharge valve is open so that any milk which is in the tank or washing liquid which then enters the tank will be drained through the discharge opening. This simple mechanism provides an interlock preventing any attempt to dilute the milk during the holding period by mixing washing liquid with the milk.

The present invention further contemplates the provision of simple and satisfactory means for supplying washing liquid, preferably hot water, to the spray means. This supply means may comprise, for example, a suitable water receptacle 195 having a cold water inlet 196 connected to the bottom thereof, the top of the receptacle being connected by the conduit 51 to the spray valve so as to supply hot water thereto. The receptacle has connected thereto upper and lower pipes 197 and 198, respectively, which are connected to each other by a vertical circulating pipe 199 in the lower end of which is a vertically extending nozzle 200, connected to a steam supply conduit 201. A heat responsive element 205 near the top of the receptacle is connected to a control valve 206 in the steam supply conduit 201 by a suitable connection 207, so that when the temperature of the water at the top of the receptacle falls below a predetermined degree, the valve 206 is automatically opened to supply steam to the nozzle 200. The steam issuing from the nozzle causes the water to circulate upwardly through the pipe 199 and downwardly through the body of the receptacle, at the same time heating the water. When the temperature of the water rises to a predetermined amount, the heat responsive element 205 automatically shuts off the steam valve 206. The heated water is carried from the top part of the receptacle through the conduit 51 to the water chamber 50 of the spray valve and is subsequently sprayed into the tank in the manner above described.

In operation, the tank 20 is initially filled with milk as, for example, by turning the control valve 33 to connect the tank with the vacuum conduit 31, which draws the heated milk at proper pasteurizing temperature into the tank. It is then held in the tank during the desired period in order to complete pasteurization thereof, after which the control valve 33 may be turned to connect the pressure conduit 32 to the tank, which will discharge the milk through the outlet pipes 27 and 24.

Before the next batch of milk is drawn into the tank, the interior of the tank is thoroughly flushed out and rinsed off by moving the handle 137 upwardly and rightwardly from the initial position shown in Figs. 7 and 9 to the position shown in Fig. 8. During the first part of the movement of the handle 137, the gear 140 on the shaft 135 operates the gear 145 on the shaft 146 to turn this shaft to pull on the rods 151 and 171 and thus to open the discharge valve 124 against the action of the weight 167. During the second part of the movement of the handle, the arm 85 on the handle shaft 135 raises the weight 82 and opens the spray valve. This permits the hot water or other desired washing liquid to flow from the receptacle 195 through the conduit 51 to the spray valve and downwardly through the valve body, issuing from the spray nozzle in all directions and falling upon substantially the entire inner surface of the tank, so that the film of milk remaining from the previous batch is thoroughly washed from the tank. A constant supply of hot washing liquid is maintained in the receptacle 195, the thermostatic control 205 acting automatically to introduce additional steam to warm up the liquid whenever the temperature falls below the desired degree.

This flushing out of the interior of the tank removes the film in which thermophilic bacteria thrive, so that the next batch of milk is not contaminated thereby. After the spraying has continued for the desired length of time, the control handle 137 is moved leftwardly from the position shown in Fig. 8 to the initial position shown in Fig. 7. The first part of this movement lowers the weight 82 and closes the spray valve without changing the position of the shaft 146 which controls the discharge valve. Thus the spray is shut off while the discharge is still open, and any washing liquid on the walls of the tank has time to flow down the walls and to reach the discharge opening before the discharge valve closes. Then during the second part of the return movement of the handle 137, the gear on the shaft 135 moves the gear on the shaft 146 to rotate this shaft to push downwardly on the rod 151 and thus to assist the weight 167 in closing the discharge valve 124. By the time the valve has been closed, all of the washing liquid has been drained from the tank, and the tank is ready to receive the next batch of milk, which may be introduced into it by any suitable means such as operation of the valve 33 to connect the tank to the vacuum conduit 31. This cycle of operation is repeated as often as desired.

While one embodiment of the invention has been disclosed, it is to be understood that the inventive idea may be carried out in a number of ways. This application is therefore not to be limited to the precise details disclosed, but is intended to cover all variations and modifications thereof falling within the spirit of the invention or the scope of the appended claims.

I claim:

1. Milk pasteurizer holding apparatus comprising, in combination, a milk holding tank having a milk inlet and a milk outlet, spray means within said tank for spraying a washing liquid into said tank, discharge means for said washing liquid, and mechanism for concomitantly controlling said spray means and said discharge means.

2. Milk pasteurizer holding apparatus comprising, in combination, a milk holding tank having a milk inlet and a milk outlet, means for applying a flowing stream of washing liquid to the inner surface of said tank to wash any residual milk therefrom after milk has been discharged from said tank, and discharge means independent of said milk outlet for discharging said washing liquid from said tank.

3. Milk pasteurizer holding apparatus comprising, in combination, a milk holding tank having a milk inlet and a milk outlet, means for applying a flowing stream of washing liquid to the inner surface of said tank to wash any residual milk therefrom after milk has been discharged from said tank, discharge means for discharging said washing liquid from said tank, and operating mechanism connected both to said liquid applying means and said discharge means for operating said liquid applying means and for concomitantly opening said discharge means.

4. Milk pasteurizer holding apparatus comprising, in combination, a stationary milk holding tank having a milk inlet and a milk outlet, means for applying a flowing stream of washing liquid to the inner surface of said tank to wash any residual milk therefrom after milk has been discharged from said tank, discharge means for discharging said washing liquid from said tank, and interlocking mechanism preventing operation of said liquid applying means while said discharge means is closed.

5. Milk pasteurizer holding apparatus comprising, in combination, a stationary milk holding tank having a milk inlet and a milk outlet, means for supplying washing liquid to said tank to wash any residual milk therefrom, discharge means for discharging said washing liquid from said tank, and mechanism for rendering said discharge means effective only when said liquid supplying means is operated.

6. Milk pasteurizer holding apparatus comprising, in combination, a milk holding tank having a milk inlet and a milk outlet, spray means within said tank for spraying a washing liquid into said tank, discharge means for said washing liquid, and single mechanism for concomitantly operating said spray means and said discharge means.

7. The combination with a fluid treating tank having a fluid inlet and a fluid outlet, of spray means within the tank for spraying a washing liquid into said tank, discharge means for draining said washing liquid from said tank, and operating means connecting said spray means and said discharge means and effective to close said spray means prior to closing said discharge means.

8. Milk pasteurizer holding apparatus comprising, in combination, a milk holding tank having a milk inlet and a milk outlet, means for applying a stream of washing liquid to the inner surface of said tank to wash any residual milk therefrom after milk has been discharged from said tank, discharge means for discharging said washing liquid from said tank, and operating mechanism including a mutilated gear set for closing said liquid applying means in advance of closing said discharge means.

9. The combination with a fluid treating tank having a fluid inlet and a fluid outlet, of spray means within said tank for spraying a washing liquid into said tank, discharge means for said washing liquid, a shaft, means associated with said shaft, for controlling said spray means, a second shaft, means associated with said second shaft for controlling said discharge means, means for operating one of said shafts, and mechanism connecting said shafts to operate one of them from the other, said mechanism moving one shaft only during the first part of the movement of the other shaft in one direction and only during the latter part of the movement of the other shaft in the opposite direction.

10. The combination with a fluid treating tank having a fluid inlet and a fluid outlet, of spray means within the tank for spraying a washing liquid into said tank, discharge means for draining said washing liquid from said tank, and means for concomitantly operating said spray means and said discharge means, said operating means comprising a first shaft, means for rotating said shaft, means on said shaft for operating said spray means, gear means on said shaft, a second shaft, gear means on said second shaft cooperating with said gear means on the first shaft, and means operated by said second shaft for opening and closing said discharge means.

JENS N. JACOBSEN.